United States Patent [19]

Jones

[11] Patent Number: 4,799,755
[45] Date of Patent: Jan. 24, 1989

[54] LASER MATERIALS PROCESSING WITH A LENSLESS FIBER OPTIC OUTPUT COUPLER

[75] Inventor: Marshall G. Jones, Scotia, N.Y.

[73] Assignee: General Electric Company, Schenectady, N.Y.

[21] Appl. No.: 136,071

[22] Filed: Dec. 21, 1987

[51] Int. Cl.$^4$ .............................................. G02B 6/32
[52] U.S. Cl. .............................. 350/96.18; 350/96.15; 372/108
[58] Field of Search ................. 372/108; 350/96.15, 350/96.18

[56] References Cited

U.S. PATENT DOCUMENTS

| | | | |
|---|---|---|---|
| 4,564,736 | 1/1986 | Jones et al. | 350/96.29 |
| 4,676,586 | 6/1987 | Jones et al. | 350/96.20 |
| 4,681,396 | 7/1987 | Jones | 350/96.18 |
| 4,707,073 | 11/1987 | Kocher | 350/96.23 |
| 4,732,450 | 3/1988 | Lee | 350/96.18 |

Primary Examiner—William L. Sikes
Assistant Examiner—Robert E. Wise
Attorney, Agent, or Firm—Paul R. Webb, II; James C. Davis, Jr.

[57] ABSTRACT

Laser materials processing apparatus for performing processing with a fiber optic transmitted beam is disclosed. A fiber injecting lens is selected to have a focal length of sufficient length to enable the use, for materials processing, of the diverging beam emitted at an output end of the fiber without the need for a beam focusing lens type output coupler.

12 Claims, 4 Drawing Sheets

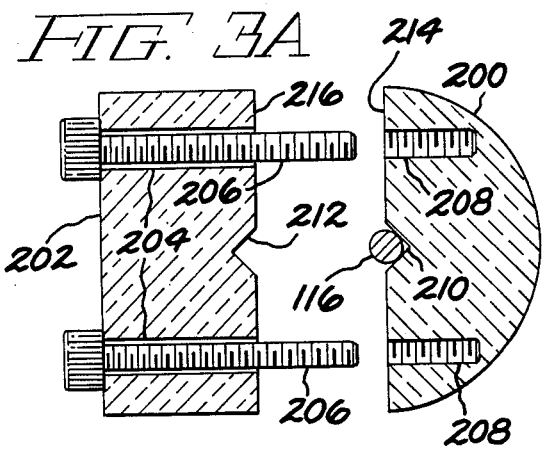
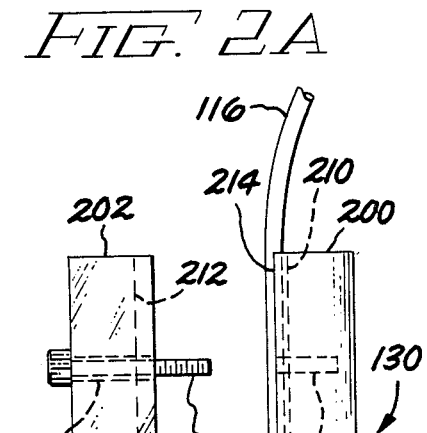
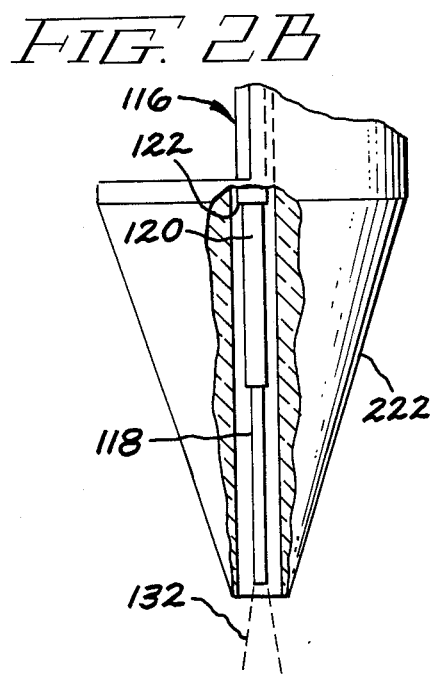
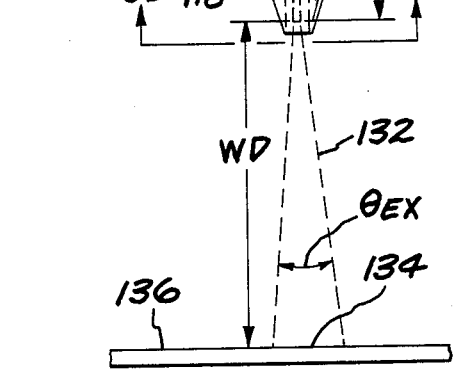
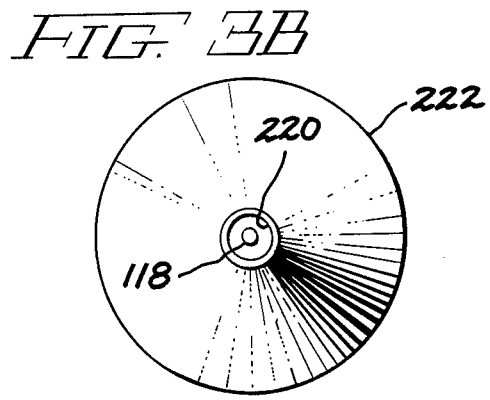

LASER MATERIALS PROCESSING WITH A LENSLESS FIBER OPTIC OUTPUT COUPLER

The present invention is directed in general toward apparatus for the processing of materials with a materials processing laser beam transmitted through a fiber optic and, more specifically, to apparatus for laser materials processing with the laser beam transmitted through a fiber optic having an lensless output coupler.

BACKGROUND OF THE INVENTION

Laser materials processing as known in the art and used herein refers to performance of materials processes such as cutting, welding, drilling and soldering, using a continuous wave or pulsed laser beam. The average power of such a laser beam may range from as little as approximately one watt to 100's of watts, the specific power being selected on the basis of the particular process being performed. It is also known in the art to transmit the laser beam from the laser to the vicinity of the workpiece by means of a fiber optic. The apparatus and method for injecting a power laser beam into a fiber optic for transmission therethrough are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System" the disclosures of those patents being incorporated in their entirety herein by reference.

In order to perform materials processing with the laser beam emitted at an output end of the transmitting fiber optic, it is necessary to terminate the fiber output end in an output coupler that includes lens apparatus for collimating and focusing the emitted beam. There are two major drawbacks to the use of such output couplers. The first drawback is that the physical sizes of the output coupler may prevent access to isolated or tightly spaced areas of the workpiece that require subjection to the materials processing laser. It would therefore be desirable to provide laser materials processing apparatus in which the output end of the beam transmitting fiber optic can be positioned to access isolated or tightly spaced areas of the workpiece.

The second drawback to the use of known fiber optic output couplers is that the coupler physical size prevents assembling a closely packed grouping of multiple fibers to accommodate a corresponding set of closely packed points on the workpiece, e.g. terminals of an electrical circuit component being soldered to a circuit board. It would therefore be desirable to provide laser materials processing apparatus in which the fiber optic output ends can be assembled into a closely packed group to accommodate a like group of points on the workpiece.

One attempted solution known in the art for overcoming the above described problems deriving from the output coupler size is the use of miniature lenses to construct the output coupler. Such miniature lenses typically have diameters that are two to five times the fiber diameter and are both difficult and expensive to fabricate. Further, it is especially difficult to fabricate such lenses with a focal length sufficient to maintain a reasonable working distance from the workpiece. Additionally, where the diameter of such miniature lenses is on the order of 1 mm, the aperture of the lens holding device may, disadvantageously, occlude a portion of the beam being collimated and focused thereby.

A second attempted solution known in the art to overcome the above described output coupler problems is to shape the output end of the fiber optic to control the shape of the emitted laser beam. If shaping of the emitted beam were successfully achieved by this method, then no lens would be required to collimate or focus the emitted beam. Typically, the fiber output end is shaped with a flame or $CO_2$ laser beam to achieve a spherical shape. The spherical shape has a focusing effect with a focal point very close, e.g. less than 1 mm, to the end of the fiber. As a result, it is necessary to position the fiber end within 1 mm of the workpiece. Such proximity to the point of processing on the workpiece results in damage to the fiber end for most types of material processing.

OBJECTS OF THE INVENTION

It is a principal object of the present invention to provide a laser materials processing system and apparatus that is not subject to the aforementioned problems and disadvantages.

Another object of the present invention is to provide a laser materials processing system and apparatus in which an output end of a beam transmitting fiber optic can be positioned to access isolated or tightly spaced areas of the workpiece.

A further object of the present invention is to provide a laser materials processing system and apparatus in which the respective output ends of beam transmitting fiber optics can be assembled into a closely packed group to accommodate a like group of points on the workpiece.

SUMMARY OF THE INVENTION

The foregoing objects of the present invention are achieved by means of a new and improved laser materials processing system including apparatus comprising a fiber optic for transmitting a materials processing laser beam generated by a materials processing laser. Lens apparatus is provided for focusing a collimated portion of the laser beam onto an input end of the fiber optic for transmission therethrough, the collimated beam portion having a predetermined divergence. The lens apparatus focuses the beam onto a core portion of the fiber input end as a beam spot such that the focused spot is smaller than the diameter of the fiber core. Further, the focal length of the lens apparatus is selected, in part, so that an entry cone angle of the focused beam is less than two times an angle corresponding to a numerical aperture of the fiber optic.

An output end of the fiber optic is supported in a lensless output coupler. The diverging laser beam emitted from the fiber output end has an exit cone angle approximately equal to the entry cone angle. The injecting lens focal length is further selected to minimize the exit cone angle so that the diverging portion of the laser beam emitted from the fiber output end projects a beam spot onto a workpiece at a predetermined working distance from the fiber output end and the projected spot has a power density sufficient to perform a predetermined laser materials processing task on the workpiece. In a preferred embodiment, an end portion of the fiber optic proximate the output end is stripped to expose the fiber core. The output coupler supports the fiber by clamping an unstripped portion of the fiber optic adjacent the end portion. The end portion is positioned within the output coupler in a manner to maintain it free from contact therewith.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

FIGS. 2A and 2B illustrate an exemplary output coupler, constructed in accordance with the present invention, for supporting an output end of a laser beam transmitting optical fiber, FIG. 2B being an enlarged view of an output coupler nose portion;

FIGS. 3A and 3B respectively illustrate sections 3A—3A and 3B—3B in FIG. 2;

DESCRIPTION OF THE INVENTION

The present invention is directed to laser apparatus for use in a laser material processing system in which an output end of a beam transmitting fiber optic is supported in a lensless output coupler. The inventor has discovered that appropriate selection of the lens focal length used for injecting the beam into a fiber input end, subject to various system constraints described hereinbelow, results in a projected spot of the diverging beam emitted at the fiber output end, as projected on a workpiece positioned at a reasonable working distance from the fiber output end, having a sufficient power density to perform laser materials processing tasks. Since no lenses are required in the output coupler, that coupler can be constructed of sufficiently small size to avoid the above described problems experienced with prior art output coupler. Further, the ability to maintain a sufficient working distance from the workpiece enables interposition of a protective, transmissive shield between the fiber output end and workpiece.

Figure 1:
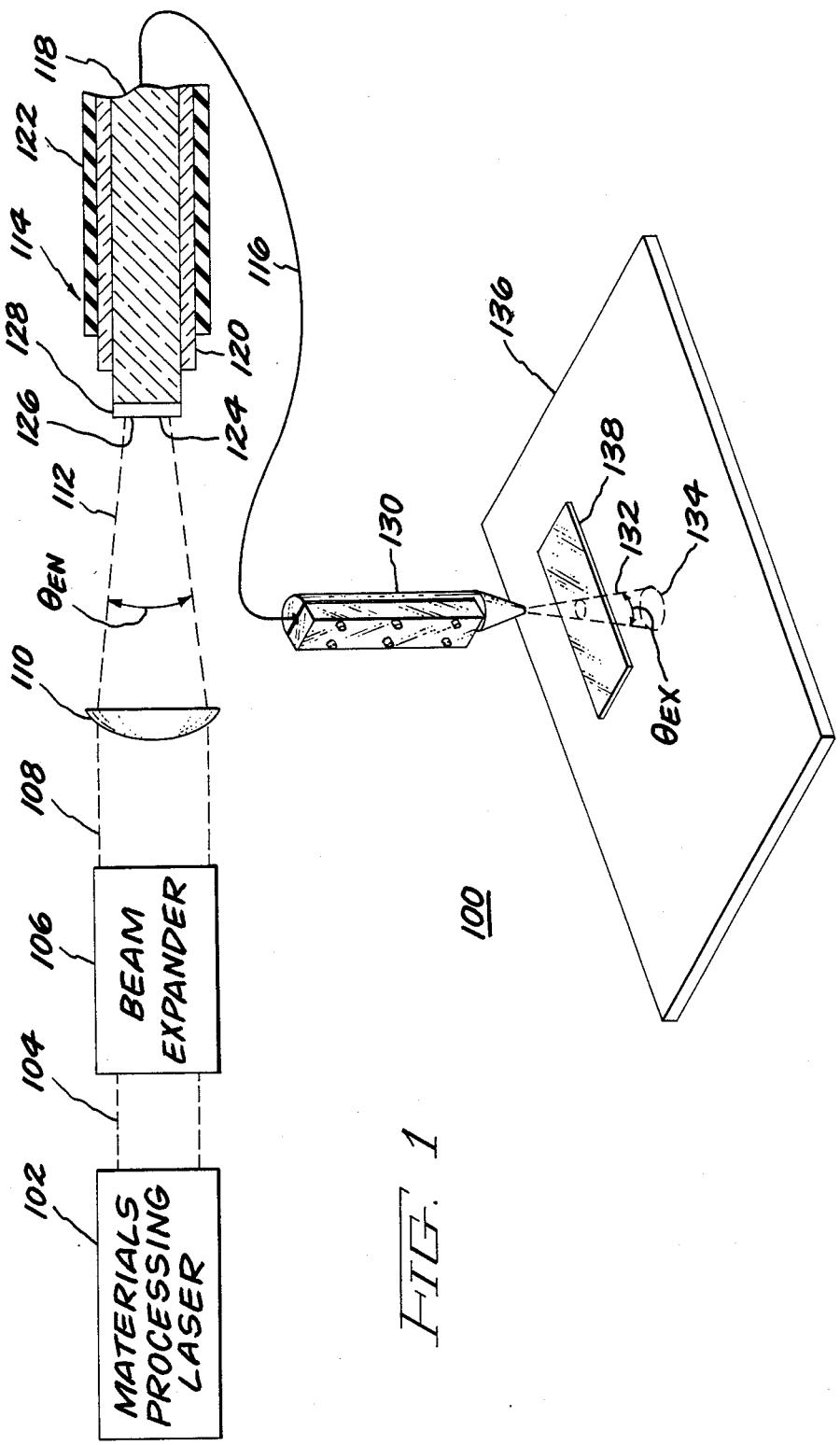
FIG. 1 illustrates a laser materials processing system constructed in accordance with the present invention.

Referring now to the drawings, FIG. 1 illustrates a laser materials processing system 100 including apparatus constructed in accordance with the present invention. System 100 includes a materials processing laser 102 which generates a nearly collimated laser beam 104. Laser 102 may be provided as any power laser that generates a laser beam suitable for materials processing, for example an Nd:YAG laser. Beam 104 is applied to a beam expander 106 which provides a collimated beam 108 having a greater diameter and being better collimated than collimated beam 104. Collimated beam 108 is applied to a plano-convex focusing lens 110 which focuses the beam. A focused portion 112 of the beam is directed onto an input portion 114 of a single core fiber optic 116. Fiber optic 116 is selected for efficient transmission of the laser beam generated by laser 102. Input portion 114 of the fiber is enlarged in FIG. 1 to illustrate the fiber structure. In the case where laser 102 is provided as an Nd:YAG laser, fiber 116 may comprise a fused quartz core 118 with clear silicon cladding 120 and an outer nylon jacket 122 for physical protection. Focused portion 112 of the laser beam is focused as a beam spot 124 on an input end 126 of fiber core 118, the input end being polished optically flat for best results. To enhance transmission of the laser beam energy into the optical fiber, an anti-reflective coating 128 can be provided on core end 126. For the preferred practice of the invention herein, fiber 116 is of the step-index type. In such a fiber, the index of refraction of the core is constant with radius and approximately one to five percent greater than that of the cladding.

The above incorporated U.S. Pat. Nos. 4,564,736; 4,676,586; and 4,681,396 describe in detail the appropriate end preparation of fiber 116 for efficient injection therein of a power laser beam. Those patents also describe two basic criteria for efficient beam injection. First, the included, or entry cone, angle of focused beam 112, indicated in FIG. 1 as $\theta_{EN}$ must be less than twice the angle corresponding to the numerical aperture of the fiber optic. Second, the size of focused spot 124, as measured by its diameter, must be less than the diameter of the fiber core. If the focused beam falls incident on some portion of the fiber other than the prepared surface of end 126, damage to the fiber can result. As is known in the art and assuming fiber end 126 is positioned at the focal point of lens 110, a diameter s of focused spot 124 can be computed from the focal length f of lens 110 and the divergence $\theta_D$ (not illustrated in FIG. 1) of collimated beam 108. This is expressed in equation (1) as:

$$s = f\theta_D. \tag{1}$$

As also known in the art, the beam quality of a laser beam is the product of the beam diameter and beam divergence, typically expressed in mm-mrad. As is further known, the beam quality remains constant through any beam expansion process so that in the case of system 100, while collimated beam 108 has the same beam quality as collimated beam 104, the diameter and divergence $\theta_D$ of beam 108 are respectively larger and smaller than that of beam 104. Thus, expanding the beam serves to reduce the beam divergence $\theta_D$ and, as seen from equation (1), also serves to reduce the focused spot size s. As is also seen from equation (1), as the focal length of lens 110 is increased, the spot size increases. Since there is both a theoretical and practical limit on the minimum value of $\theta_D$, for a given fiber core diameter there is a maximum lens focal length that cannot be exceeded without violating the above described spot size criterion. It is noted that while there is such a limitation on increasing the lens focal length, there is a conflicting desire to increase the focal length in order to minimize the beam entry cone angle $\theta_{EN}$.

Referring again to FIG. 1, system 100 further includes a lensless fiber output coupler 130 which supports an output end of fiber 116. A diverging portion 132 of the laser beam is emitted from the fiber optic output end and output coupler 130 is positioned so that beam portion 132 projects a beam spot 134 onto a portion of a workpiece 136 where it is desired to perform a materials process. Thus, processing is performed directly with beam portion 132 as emitted from the output end of fiber optic 116, there being no collimating or focusing lenses required within the output coupler. A glass slide 138, such as a microscope slide approximately 1 mm in thickness, is interposed between the fiber output end and the workpiece to shield the fiber end from damage that might otherwise be caused by materials expelled from the workpiece surface where beam spot 134 falls incident.

FIGS. 2A, 2B, 3A and 3B illustrate a preferred construction of output coupler 130 in greater detail. FIG. 2A is an exploded view of the output coupler. FIG. 2B is an enlarged view of a nose portion of the output coupler. FIGS. 3A and 3B are respectively sections 3A—3A and 3B—3B of FIG. 2A. Output coupler 130 is seen to comprise a base portion 200 and a cap portion 202. The cap portion includes six holes 204 through which are freely passed threaded screws 206. Base 200 includes six holes 208 threaded for screw engagement with screws 206. Fiber 116 is seen to lie in grooved channels 210 and 212 of base 200 and cap 202, respectively. Channels 210,212 are cut to a depth less than the radius of the fiber optic (including jacket) to be held. As a result, with the fiber in place in the output coupler, when screws 206 are tightened into screw holes 208, the fiber optic is clamped between base 210 and cap 212 while respective opposing surfaces 214 and 216 of the base and cap do not make contact. In accordance with the preferred practice of the present invention, the jacket and cladding are stripped from an end portion 218 of fiber optic 116 to expose the fiber core. The tip of the fiber core is preferably cut flat so that the cut face is normal to a longitudinal axis of the fiber. A passage 220 through a nose portion 222 of the output coupler is provided with a circular cross section having a diameter greater than that of fiber core 118. It is necessary that there be no contact between core 118 and the wall of output coupler passage 220 since leakage of the beam being transmitted through the fiber core would otherwise result at the fiber core surface. The output end of the fiber, i.e. the tip of the fiber core, is positioned substantially at the tip of nose portion 222. The output coupler is preferably fabricated of a laser beam transparent material such as quartz or Plexiglass ® material.

Referring again to FIG. 2A, in which glass slide 138 has been omitted for clarity, a working distance (WD) is defined between the output end of the fiber optic and workpiece 136. It is noted that some minimum working distance must be maintained in order to introduce the protective glass slide, a minimum distance on the order of 5-10 mm being preferred herein. Diverging portion 132 of the laser beam is characterized by an included, or exit cone, angle indicated as $\theta_{EX}$ in FIG. 2A. In order to achieve a sufficient power density in beam spot 134 to perform materials processing, it is necessary to minimize the value of $\theta_{EX}$. The inventor has observed $\theta_{EX}$ to be approximately equal to the above described $\theta_{EN}$. The inventor has discovered that a sufficiently long focal length can be selected for beam injecting lens 110 so that $\theta_{EN}$, and hence $\theta_{EX}$, are small enough to achieve sufficient power density in the projected beam spot to perform materials processing, for a reasonable working distance, while also achieving both a focused spot size on the beam input end smaller than the fiber core diameter and a $\theta_{EN}$ value less than twice the angle corresponding to the fiber numerical aperture. Such a lens focal length can be selected for use with relatively small core diameter optical fibers, e.g. 0.2 mm, and laser beams having a readily attainable beam quality, e.g. 25 mm-mrad or less. Since these various parameters are interdependent in the manner described hereinabove, different combinations of laser, expanded laser beam divergence, fiber diameter, lens focal length and working distance can be practiced. Further, as is well known in the art, the power density required for successful practice of different materials processes varies with the type of process. For example, welding or drilling requires a substantially greater power density than soldering.

In the operation of system 100 (FIG. 1), materials processing laser 102 generates beam 104 which is expanded to beam 108 in order to minimize the beam divergence. Beam 108 is focused by focusing lens 110 as a spot 124 onto input end 126 of fiber optic 116 for transmission therethrough. The beam is emitted from the output end of fiber optic 116 which is supported in output coupler 130 and projects a spot 134, onto workpiece 136, having sufficient power density to perform a desired materials processing task. The focal length of lens 110 is selected such that the size of focused spot 124 is less than the diameter of fiber core 118, $\theta_{EN}$ is less than twice the angle corresponding to the numerical aperture of fiber optic 116 and $\theta_{EX}$ is sufficiently small to enable achievement of a sufficient projected beam spot 134 power density for a reasonable working distance between the workpiece and fiber optic output end.

The invention has been successfully practiced by the inventor to perform the reflow of solder joints on an electrical circuit board, a 50 watt Nd:YAG laser manufactured as model #767 by Coherent General, Inc. of Sturbrige, MA being employed in that successful practice. To achieve the requisite power density to reflow the solder joints, the laser was operated to deliver an average power of only 5-10 watts and the reflow was successfully achieved while operating the laser in both a continuous wave and pulsed mode. The focal length of the beam injecting lens was 250 mm and the fiber core diameter was 0.6 mm. The working distance was approximately 5-10 mm with a 1 mm glass slide being used to shield the output end of the fiber optic. The output coupler used was constructed as illustrated in FIGS. 2A, 2B, 3A and 3B. That coupler was fashioned from a Plexiglass ® material and had an overall length of approximately 4" including a nose portion of about 1" in length. The greatest diameter along the length of the coupler, including the cap, was about ¾". It is noted that through the use of higher power lasers, other materials processing tasks requiring greater power densities can be successfully practiced.

Figure 4:
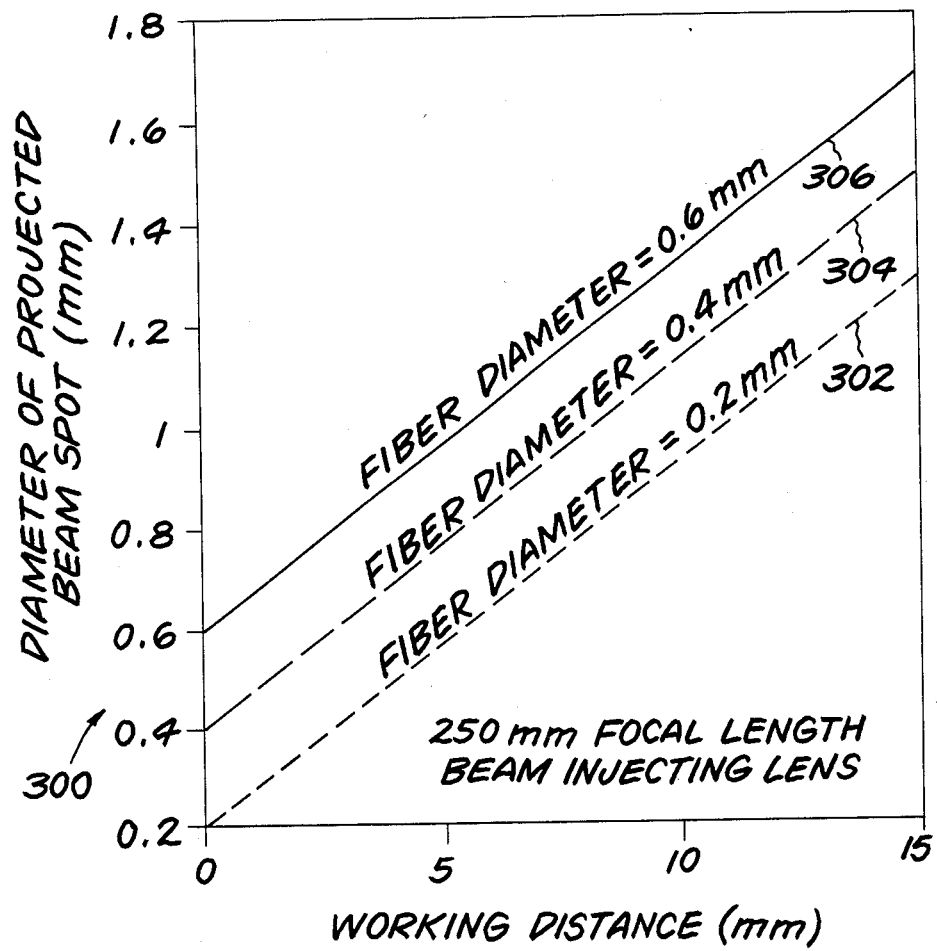
FIG. 4 shows a graphical illustration of projected beam spot diameters plotted as a function of working distance for different fiber optic diameters and a 250 mm focal length beam injecting lens.

FIG. 4 shows a graphical illustration 300 of diameter of the beam spot projected on the workpiece plotted against the working distance between the fiber output end and workpiece. Three such plots 302, 304 and 306 are plotted for fiber core diameters of 0.2, 0.4 and 0.6 mm, respectively, all plots being for the use of a 250 mm focal length lens for injecting a laser beam into the fiber optic input end. Each plot assumes the use of a laser beam having a beam divergence at least small enough to enable successful injection into the diameter of the particular fiber with the 250 mm lens.

Figure 5:
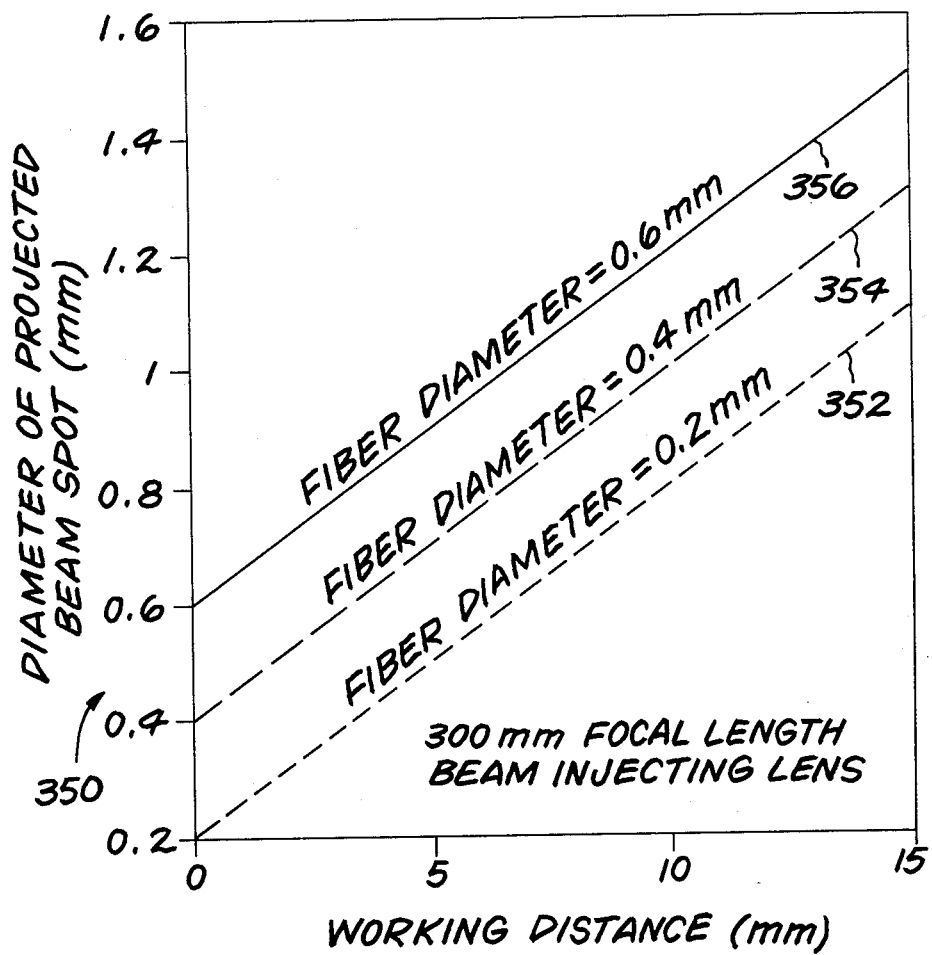
FIG. 5 shows a graphical illustration of projected beam spot diameters plotted as a function of working distance for different fiber optic diameters and a 300 mm focal length beam injecting lens.

FIG. 5 shows a graphical illustration 350 of projected beam spot diameter plotted against working distance. Three plots 352, 354 and 356 are shown for fiber core diameters of 0.2, 0.4 and 0.6 mm, respectively, all plots being for the use of a 300 mm focal length beam injecting lens. As in the case of FIG. 4, each plot illustrated in FIG. 5 assumes the use of a laser beam having a beam divergence at least small enough to enable successful injection with the 300 mm lens.

With respect to both FIGS. 4 and 5, since the projected beam spot is substantially circular, the spot area can be calculated from the spot diameter and, upon assuming an average laser beam power, projected spot power densities can be readily calculated for different working distances and fiber core diameters.

Thus, the present invention enables practice of laser materials processing tasks with the lensless output coupler. As a result, the above described problems associated with the prior art output coupler are overcome. Using the lensless output coupler, the output end of the fiber optic can readily be positioned to access isolated or tightly spaced areas of the workpiece. In fact, since the output coupler only serves to support the fiber output end, the size and shape of the coupler can be adapted to meet the requirements of a particular process situation. To this end, an output coupler can be adapted to support multiple fiber output ends in a closely packed grouping to accommodate a like grouping of points on the workpiece.

While a single plano-convex lens 110 is described hereinabove for focusing the laser beam for injection into the fiber optic, the invention is not so limited. Other types of lenses or configurations of multiple lenses are known in the art for use in beam focusing and, if provided with the appropriate focal length, may be used in the practice of the present invention.

While the use of a beam expander is preferred in the practice of the present invention, the invention may be successfully practiced without a beam expander. As described above, the beam expander is provided to minimize the laser beam divergence. It is preferred herein to expand the beam to the maximum extent possible in order to minimize the divergence and thereby both minimize the focused spot size and increase the limit on the injecting lens focal length that may be successfully employed. However, if the laser beam is generated by the laser with a sufficiently good beam quality and low divergence, beam expansion may not be necessary in order to successfully practice the present invention.

While a glass slide is described hereinabove as a protective shield for use in protecting the output end of the fiber optic, the invention is not so limited. Any material that is substantially transparent to the laser beam and provides minimum attenuation may be used. For example, a sheet of Mylar ® film or a Lucite ® sheet may be used with equal effectiveness as the protective shield. It is important to note that during laser materials processing practiced in accordance with the present invention, materials expelled from the workpiece will typically deposit on the protective shield, so that the shield must be replaced frequently. It is therefore preferred herein to use an inexpensive, readily available material, such as glass slides, for the shield. Further, since the above described shield materials provide a minimum, acceptable attenuation to the emitted laser beam, there is no need to take extraordinary steps, e.g. applying an antireflective coating to the shield, to further minimize attenuation.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Laser materials processing apparatus, comprising:
   a fiber optic for transmitting a materials processing laser beam, said fiber optic having a predetermined diameter;
   lens means for focusing a collimated portion of the laser beam as a focused beam portion onto an input end of said fiber optic for transmission therethrough, the collimated laser beam having a predetermined beam divergence;
   output coupling means for supporting an output end of said fiber optic;
   a diverging portion of the laser beam emitted from said fiber optic output end having an exit cone angle approximately equal to an entry cone angle of the focused beam portion; and
   said lens means having a focal length selected so that the diverging portion of the laser beam emitted from said fiber optic output end projects an unfocused beam spot onto a workpiece positioned at a predetermined working distance from said fiber optic output end, the projected unfocused spot having a power density sufficient to perform a predetermined laser materials processing task on the workpiece.

2. The apparatus of claim 1 wherein the collimated portion of the laser beam is focused by said focusing means as a focused beam spot on the fiber optic input end, the focused beam spot being smaller in diameter than the predetermined fiber optic diameter; and
   said fiber optic having a characteristic numerical aperture, the focal length of said lens means being further selected so that an entry cone angle of a focused beam portion is less than two times an angle corresponding to said fiber optic numerical aperture.

3. The apparatus of claim 2 further including laser beam expanding means for providing the collimated beam portion with the predetermined beam divergence, the predetermined divergence of the collimated beam portion satisfying the following equation for focused spot diameter:

$$s = f\theta_D$$

where:
   $s$ = diameter of the focused beam spot;
   $f$ = focal length of said lens means; and
   $\theta_D$ = the predetermined beam divergence.

4. The apparatus of claim 2 wherein the focused beam spot is focused on a core portion of said fiber optic; and
   the focused beam spot being smaller than the diameter of said fiber optic core portion.

5. The apparatus of claim 4 wherein said fiber optic is of the step-index type.

6. The apparatus of claim 5 wherein an end portion of the fiber optic proximate the output end is stripped to expose said core portion; and
   said output coupling means clamping an unstripped portion of said fiber optic adjacent said end portion, said end portion being positioned within said output coupling means free from contact therewith.

7. A laser materials processing system, comprising:
   a materials processing laser for generating a materials processing laser beam;
   a fiber optic for transmitting the materials processing laser beam, said fiber optic having a predetermined diameter;

lens means for focusing a collimated portion of the laser beam as a focused beam portion onto an input end of said fiber optic for transmission therethrough, the collimated laser beam having a predetermined beam divergence;

output coupling means for supporting an output end of said fiber optic;

a diverging portion of the laser beam emitted from said fiber optic output end having an exit cone angle approximately equal to an entry cone angle of the focused beam portion; and said lens means having a focal length selected so that the diverging portion of the laser beam emitted from said fiber optic output end projects an unfocused beam spot onto a workiece positioned at a predetermined working distance from said fiber optic output end, the projected unfocused spot having a power density sufficient to perform a predetermined laser materials processing task on the workpiece.

8. The system of claim 7 wherein the collimated portion of the laser beam is focused by said focusing means as a focused beam spot on the fiber optic input end, the focused beam spot being smaller than the predetermined fiber optic diameter; and said fiber optic having a characteristic numerical aperture, the focal length of said lens means being further selected so that an entry cone angle of a focused beam portion is less than two times an angle corresponding to said fiber optic numerical aperture.

9. The system of claim 8 further including laser beam expanding means for providing the collimated beam portion with the predetermined beam divergence, the predetermined divergence of the collimated beam portion satisfying the following equation for focused spot diameter:

$$s = f\theta_D$$

where:
s = diamter of the focused beam spot;
f = focal length of said lens means; and
$\theta_D$ = the predetermined beam divergence.

10. The system of claim 8 wherein the focused beam spot is focused on a core portion of said fiber optic; and the focused beam spot being smaller than the diameter of said fiber optic core portion.

11. The system of claim 10 wherein said fiber optic is of the step-index type.

12. The system of claim 11 wherein an end portion of the fiber optic proximate the output end is stripped to expose said core portion; and said output coupling means clamping an unstripped portion of said fiber optic adjacent said end portion, said end portion being positioned within said output coupling means free from contact therewith.

* * * * *